Sept. 15, 1964    A. G. LATRUBESSE    3,148,413
MANUFACTURE OF MOLDED ARTICLES CARRYING INDICIA
Filed Oct. 25, 1961    6 Sheets-Sheet 1
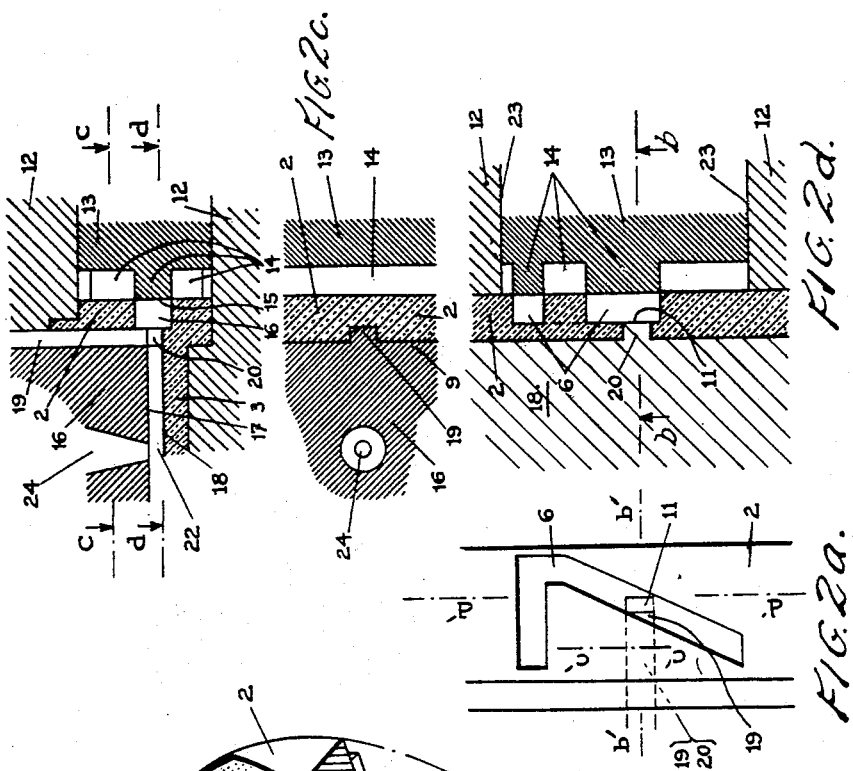
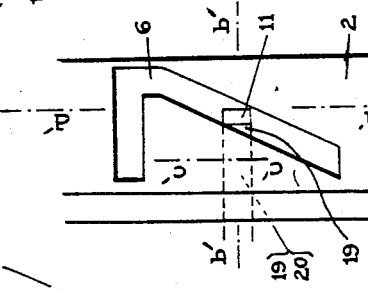
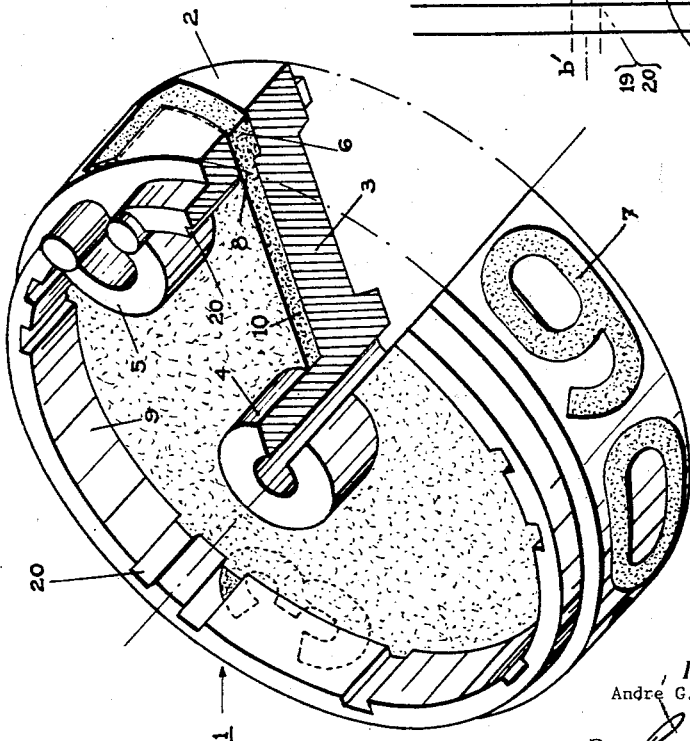
Inventor
André G. Latrubesse
By 
Attorney Inventor
André G. Latrubesse

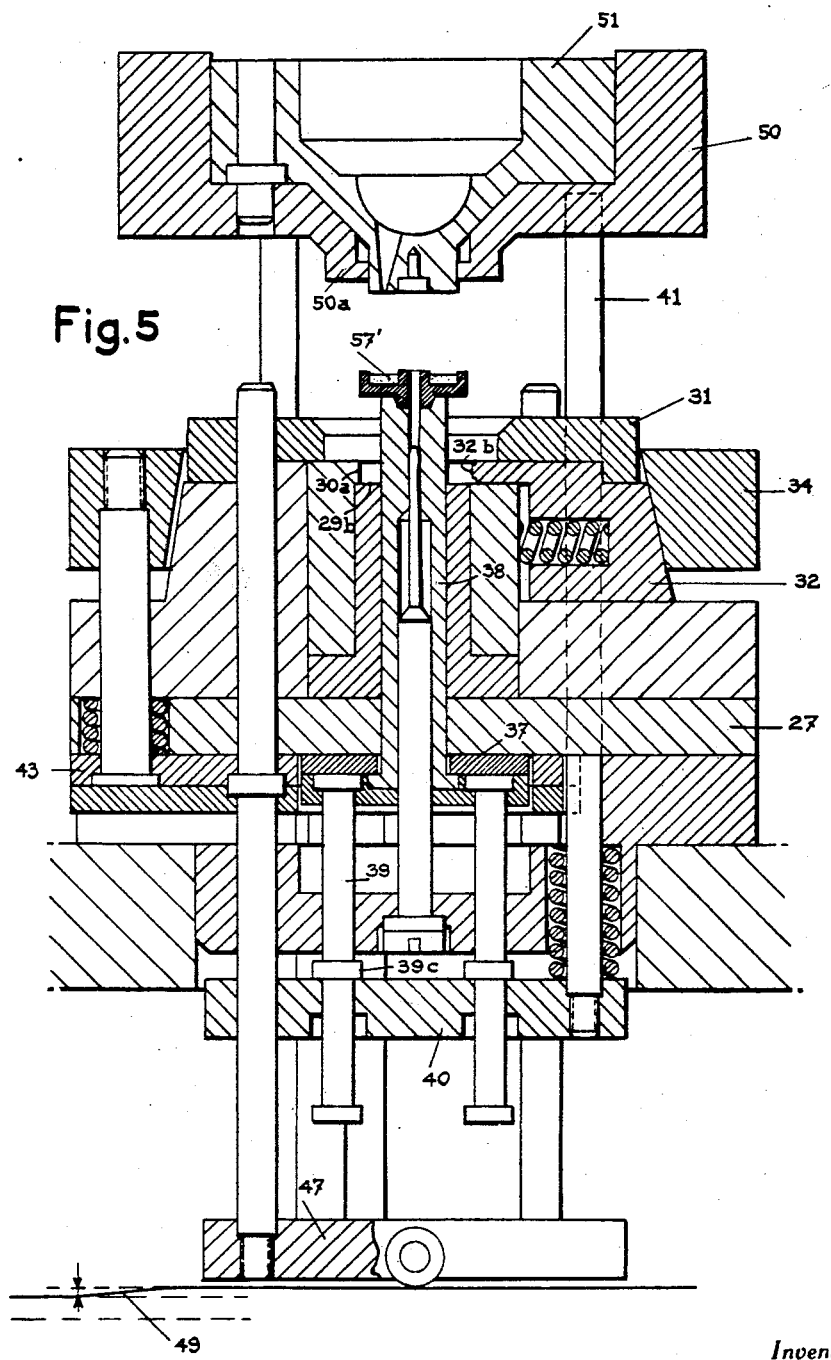

Sept. 15, 1964      A. G. LATRUBESSE      3,148,413
MANUFACTURE OF MOLDED ARTICLES CARRYING INDICIA
Filed Oct. 25, 1961      6 Sheets-Sheet 6

Inventor
André G. Latrubesse
By *Percy P. Lantzy*
Attorney

United States Patent Office 3,148,413
Patented Sept. 15, 1964

3,148,413
MANUFACTURE OF MOLDED ARTICLES
CARRYING INDICIA
André Gérard Latrubesse, Boulogne-Billancourt, France, assignor to International Standard Electric Corporation, New York, N.Y., a corporation of Delaware
Filed Oct. 25, 1961, Ser. No. 147,688
Claims priority, application France, Nov. 18, 1960, 844,355, Patent 1,280,104
5 Claims. (Cl. 18—30)

The present invention relates to the manufacture of molded articles carrying indicia or signs such as characters, figures, arithmetic signs, etc., also molded, and more particularly to the manufacture of telephone or distance meter wheels etc.

A well known method comprises molding first a piece having recesses for the signs and ducts through said piece between its inner or rear face and the bottom wall of said recesses, and then molding the signs in said recesses through said ducts, i.e. from behind. The present invention relates to such a process.

According to the various known ways of manufacturing, the piece is totally or partly stripped or is displaced before molding the signs thereon, and generally is placed in another mold for this last operation. Now, each stripping or mere displacement of the piece causes deformations which require relatively large tolerances to be allowed for the dimensions of the second mold and complete article. In a case such as that of meter wheels, where the complete article is a mechanical member, it is necessary to use further machining operations in order to obtain accurate dimensions. The present invention provides a manufacturing method which avoids these drawbacks and leads to a substantial saving.

According to a feature of the invention, the mold wherein the first piece is molded comprises mobile parts which provide recesses, ducts, etc.—in said piece for an overmolding from the inside or rear side, said mobile parts being moved apart or withdrawn to an appropriate extent after the molding of said piece for disengaging said recesses, ducts, etc.—in order to allow for injection therein of the overmolding material from the rear or inner face without stripping the first piece, whereas the mold parts which shape the first piece where it does not receive overmolding material, remain stationary up to the final stripping.

According to another feature of the invention, the mold comrpises relatively large parts wihch remain stationary during the two moldings and relatively small parts which are displaced between the two moldings, to wit, at least a part which provides the recess in the piece and is displaced outwardly without quite leaving the recess so as to close the latter, and at least a part on the opposite face of the piece, which provides the injection duct and which is laterally displaced so as to uncover a small surface in the bottom wall of the recess, forming a communication aperture between the duct and the recess, so that the molding of the signs is effected in the same mold as the molding of said piece, after a suitable displacement of the above-mentioned parts.

According to another feature of the invention, the article (for instance, a meter wheel) is entirely molded in a mold which comprises, in a manner known per se, outwardly (for instance radially) movable external dogs, which provide recesses in the piece for the signs, and a laterally (for instance axially) movable inner core which has external ribs which contact the ends of the dogs and thus provide ducts in the thickness of the piece.

The arrangement according to the invention has means for withdrawing said dogs outwards, after molding the piece, without quite making them leave the recesses, so that the latter remain closed by the ends of the dogs, and means for laterally displacing the core so as to uncover apertures in the bottom wall of the recesses for communicating with the ducts. For molding the piece, the first material is injected into the mold with the dogs and the core in an engaged position, whereafter the dogs and the core are displaced as stated above, and without stripping the piece or displacing it in its seat, the second material is injected into the space which has been freed between the molded piece and the core by displacing the latter, to mold the signs in the recesses through the above-mentioned ducts and apertures. After this second molding in the same mold, the latter is opened, and the complete article, i.e. the molded piece with molded signs in its recesses, is stripped.

According to another feature, the mold has an injection duct which is successively connected to the injection devices of the molding material and the overmolding material so that the same duct is used for both operations.

According to another feature, the invention provides a machine wherein three molds are mounted on a movable base which successively stops them before a first injector for molding the piece, before a second injector for molding the signs, and in an ejection or stripping position. Control means, such as fixed slides, are provided to act between the three positions on the dogs and the core of each mold so as to displace them, as mentioned above, between the first and second injection and to displace again these parts and other parts of the mold between the second injection and the stripping, and to bring again all these parts into their initial relative position as the mold comes back before the first injector. Preferably, the movable base is provided, between the molds, with scrapers or similar devices to pull out when passing over the "sprues" of molding material from the injectors between two injections.

Other features and advantages of the invention will become apparent from the following description with reference to the accompanying drawing, in which:

FIGURE 1 represents in an isometric view, partially broken away, on an enlarged scale, a meter wheel manufactured according to the invention;

FIGURES 2(a, b, c and d) represent fragmentary detailed views of said wheel and mold, viz.:
  (a) A top plan view,
  (b) A sectional view taken along line a—a of FIGURE 2(d), and represented by b'—b' on FIGURE 2(a);
  (c) A sectional view taken along line c—c of FIGURE 2(b), and represented by c'—c' on FIGURE 2(a);
  (d) A sectional view taken along line d—d of FIGURE 2(b), and represented by d'—d' on FIGURE 2(a), FIGURE 3 is a vertical sectional view of a mold and injection device for the molding of the piece;

FIGURE 5 is a similar vertical sectional view for the stripping;

Figure 3:
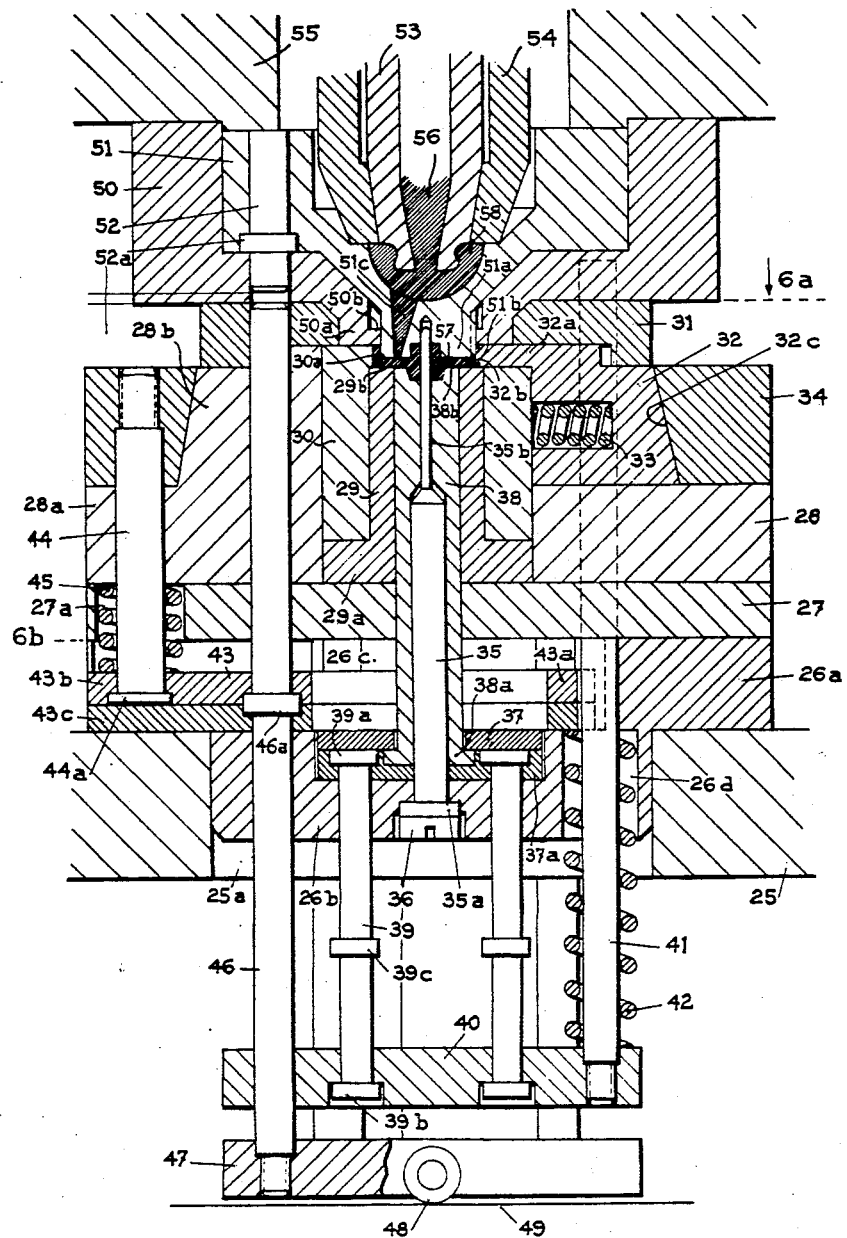

The meter wheel represented in FIGURE 1 comprises first a molded piece 1 which substantially is constituted by rim 2, flange 3 and stock 4. In the drawing, said piece, moreover, comprises "lantern" 5, intended for driving, represented for illustrating various elements which may be provided according to the driving mode chosen. In recesses 6 provided in the rim, numerals "7" are molded. The molding material for these numerals, which is for instance a white material when the piece material is for instance a black one, is injected in recesses 6 from behind through ducts 8 provided in the rim between the inner face 9 thereof and the bottom wall of recesses 6. On the same side, the material for numerals constitutes a layer 10 on flange 3.

The part of meter wheel represented in FIGURE 2 corresponds to numerals "7" through which passes the section in FIGURE 1. The detailed views of FIGURE 2 show the piece before the molding of the numerals. In FIGURE 2(a), recess 6 of numerals "7" and, at the bottom wall of said recess, aperture 11 formed as explained hereunder, are shown.

The sectional views of FIGURES 2(b, c and d) represent the piece and the mold 12 thereof. In the latter, an external radially sliding dog 13 is inserted in front of each numeral. On its inner face, each dog carries a projecting numeral 14 which has to be formed in hollow in rim 2. When the molding of the piece takes place, the dog is in an advanced position. After this molding, the dog is moved back, as shown in FIGURE 2, so that the end 15 of projection thereof 14 is nearly disengaged from recess 6 and blocks it from the exterior. Axially sliding core 16 is inserted in mold 12 inside rim 2, the inner face of which is thus molded. When the molding of the piece takes place, the core is in a thrust position and its lower face 17 molds the corresponding face 18 of flange 3. Said core externally carries ribs 19 which form in the rim inner grooves 20 (FIGURE 1). Said ribs touch the end of projections 14, and there is at least one rib for each distinct projection. After the molding of the piece, and the "sprue" being ejected, the core goes up again, as shown in FIGURE 2, so that ribs 19 open aperture 11 between the bottom wall of recess 6 and the free part of groove 20, while end 17 frees space 22 between said end and face 18 of the piece.

The second material will be injected in this space, through the same hole 24, provided in core 16, as the first material which constituted piece 1. From space 22 comprised between rim 2 and stock 4, the second material passes through injection duct 20 formed by the free end of the groove and by aperture 11 in recess 6, which material fills up to end 15 of dog 13. It will be noted that in FIGURES 2(c and d), the vertical lines which are represented as straight lines for simplification purposes are really segments. The horizontal lines in principle would correspond to circle radii, but in FIGURE 2(d) they all relate to a dog and are parallel between themselves in order to secure, on the one hand the radial movement of the dog between faces 23 of its compartment in mold 12, and on the other hand the closing of recesses 6 by projections 14 in the withdrawn position of the dog, represented in said figure.

The manufacture of a mold according to the invention will be now described with reference to FIGURES 3–6, first to FIGURE 3. In a mounting plate 25 is fixed a base 26 comprising a thick flange 26a suitably cut as mentioned hereinafter, and an end plate 26b inserted in recess 25a of mounting plate 25. On flange 26a is fixed a back plate 27 on which is fixed a part 28 comprising flange 28a and cone 28b. In a central chamber of element 28 is placed a bushing 29 provided with a flange 29a which is supported by back plate 27. The top 29b of bushing 29 forms an outer ring for the bottom wall of the mold. Sleeve 30 is fixed in the chamber of element 28 for clamping bushing 29. Said sleeve over-tops bushing 29, and the top of bore 30a constitutes the periphery of the mold. Finally, a ring 31 is fixed on the cone vertex 28b and overlaps sleeve 30 for clamping it in element 28.

Cone 28b, top of sleeve 30 and the under part of ring 31 are suitably recessed to insert dogs 32 and to secure the radial movement thereof. Each dog 32, the element of which is placed in element 28, comprises a tongue 32a which penetrates into ring 31 and sleeve 30, and the dog end 32b, which corresponds to dog 13 represented in FIGURE 2, forms an element of the periphery of the mold and projects the numerals or other signs which is to be molded. Spring 33 placed in a chamber of dog 32 is supported by sleeve 30 and pushes the dog outwards. A movable ring 34, the inner part of which is conical, is mounted on cone 28b. Dogs 32 have a conical heel 32c which is supported by ring 34. On the drawing, ring 34 is completely engaged on cone 28b, and consequently dogs 32 are thoroughly engaged to the mold axis. This is the position for the first molding in which projections 32b of the dogs have to provide recesses in the piece.

Figure 6:
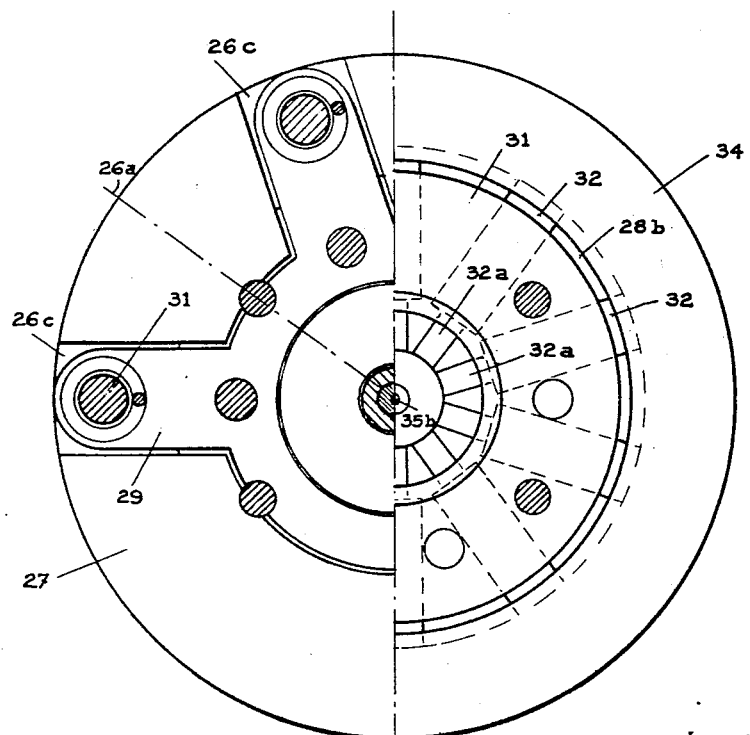
FIGURE 6 is, on the right side, a plan view taken along line 6a of FIGURE 3, the injector being removed, and, on the left side, a sectional view taken along line 6b of FIGURE 3.

The structure which has just been described is represented in the right portion of FIGURE 6.

The stationary elements of the mold comprise a pin 35, which is fixed to the center of back chamber 26b by means of bearing 36 which clamps a pin head 35a in the back chamber 26b. Said pin is terminated at the top by a thinner part 35b which over-tops sleeves 30 and which constitutes the central core of the mold.

In back chamber 26b is a movable stud 37 comprising a back plate 37a. In said stud, bushing 38 is fixed by means of edge 38a. Said bushing is guided on the stationary pin 35 and in the stationary bushing 29, and the upper end 38b forms an inner ring of the bottom part of the mold, between outer ring 29b and rod 35b. Said bushing is utilized for the stripping of the piece, as stated hereinafter. Its vertical movement is controlled by rods 39 the heads of which 39a are inserted in stud 37. Said rods are drawn downwards by plate 40 which they go through and which acts downwards (FIGURE 3) on lower heads 39b of rods 39, and upwards on collars 39c suitably spaced so that plate 40 pushes them upwards only at the end of its rising stroke.

In plate 40 are fixed rods 41, which mount through the previously described mold to raise up the upper part of the mold for the stripping, as explained hereinafter. The movement of plate 40 is biased downwards by springs 42 engaged in chambers 26d provided in the back chamber 26b, and towards the upper part by not represented means.

Flange 26a is provided with radial recesses 26c shown on the left of FIGURE 6. A cross member 43, which comprises inner circle 43a and arms 43b, is placed in the chamber and recesses 26c of flanges 26a. This cross member comprises a black plate 43c. Rods 44 are fixed to the cross member 43 by means of lower heads 44a inserted in the cross member. The upper ends of said rods are fixed in ring 34 the movement of which is thus integral with the cross member. The latter is pushed towards the lower part (position of FIGURE 3) by springs 45 which are supported by flange 28a by passing through chambers 27a in back plate 27.

Other rods 46 are also fixed to cross member 43 by collars 46a inserted in the cross element. Said rods are extended downward where they are fixed to a plate 47 which controls their movement upward. The movement of plate 47 is controlled by sprockets 48 cooperating with a stationary slide 49. Rods 46 are also extended upward through all the previously described mold to control the top of the mold, as mentioned hereinafter. The height of the back plate allows the vertical movement of the cross element 43 in recesses 26c, and the height of chambers 27a allows springs 45 entirely to be received in them when cross member 43 carries up to back plate 27.

The top of the mold is constituted by an external cup 50 and an internal cup 51 placed in the external cup and capable of rising a little. Cup 50 is settled on ring 31, and its bottom side forms a nozzle 50a which is engaged in said ring and is settled on sleeve 30 by going inwardly beyond it by an edge 50b which forms an external ring of the mold, opposite to ring 29b. Internal cup 51 has a cap 51a which is engaged through nozzle 50a and constitutes a great part of the mold, between ring 50b and pin 35b (which is engaged in a central chamber of cap 51a) in front of a part of ring 29b and ring 38b. Cap 51a corresponds to central core 16 on FIGURES 2. Said cap has ribs 51b and is penetrated by hole 51c for the injection of the material to be molded.

Pins 52 pass through the two cups 50 and 51, facing rods 46. By means of collars 52a, said rods are supported beneath by the internal cup 51, and their lower end is at some distance from the upper end of rods 46. The rising of the latter in its first part thus does not affect the top of the mold, and in its second part it causes a slight rising of the internal cup 51 without displacing the external cup.

The mold thus constituted is set under the injectors of the molding material. With its pieces in the position which has been described, said mold is placed under the injector of the first material.

The injector comprises an internal nozzle 53 and an external nozzle 54 which are situated in an injection head represented by plate 55. The external nozzle 54 is fitted in the internal cup 51 in a substantially tight manner. The internal nozzle 53 is able to rise in the external nozzle, as mentioned hereinafter. In FIGURE 3, the first material 56 has already been injected into the mold, and piece 57 has been thereby formed.

After the molding of piece 57, the first injector has risen, and the mold is placed under the second injector. This position is represented in FIGURE 4, to which reference is now made. Slide 49 has caused the rising of plate 47 by a distance less than the space between cross member 43 and back plate 27. Rods 46 (lower part) and 44 have caused the rising of cross member 43 and ring 34 an equal distance. The conical surface 32c has been allowed to move back radially in order to disengage recesses in piece 57 where the numerals have to be molded. Plate 47 has not reached plate 40, the latter has not been displaced, and the external cup 50 has remained in the same position. When rising, rods 46 (upper part) first reach rods 52 and raise them a smaller distance so that the internal cup 51 goes slightly over the external cup. By rising up from piece 57, cap 51a of cup 51 has left a little space for the second material and has disengaged the input apertures (see 11, FIGURE 2a) of the recesses disengaged by tongues 32a. The lower face of plate 55' of the second injector has a form slightly different from plate 55 (FIGURE 3) to be adjusted on cup 51 in the new position of the latter.

In FIGURE 4, the second material 56' is injected. Said material constitutes a layer on piece 57 and fills the numeral recesses according to the manner described with reference to FIGURES 2.

After this second molding, the second injector has risen again, and the mold takes the stripping position. Said position will be now described with reference to FIGURE 5. Slide 49 has again raised plate 47 so that the cross member 43 has reached back plate 27. Ring 34 has risen again, and dogs 32 have again moved back to be thoroughly disengaged from the molded meter wheel. Plate 40 has been raised by means not represented. By means of rods 41, cup 50 is raised the same distance as the internal cup 51, which has come back to the bottom part of the external cup. After rising partway, plate 40 engages collars 39c of pin 39. Rods 39, stud 37 and bushing 38 have thus risen a smaller distance. Wheel 57' is withdrawn from the mold constituted by areas 29b and 30a and has risen to a position between the top of the mold (ring 31) and the bottom part of the cups (nozzle 50a).

Figure 4:
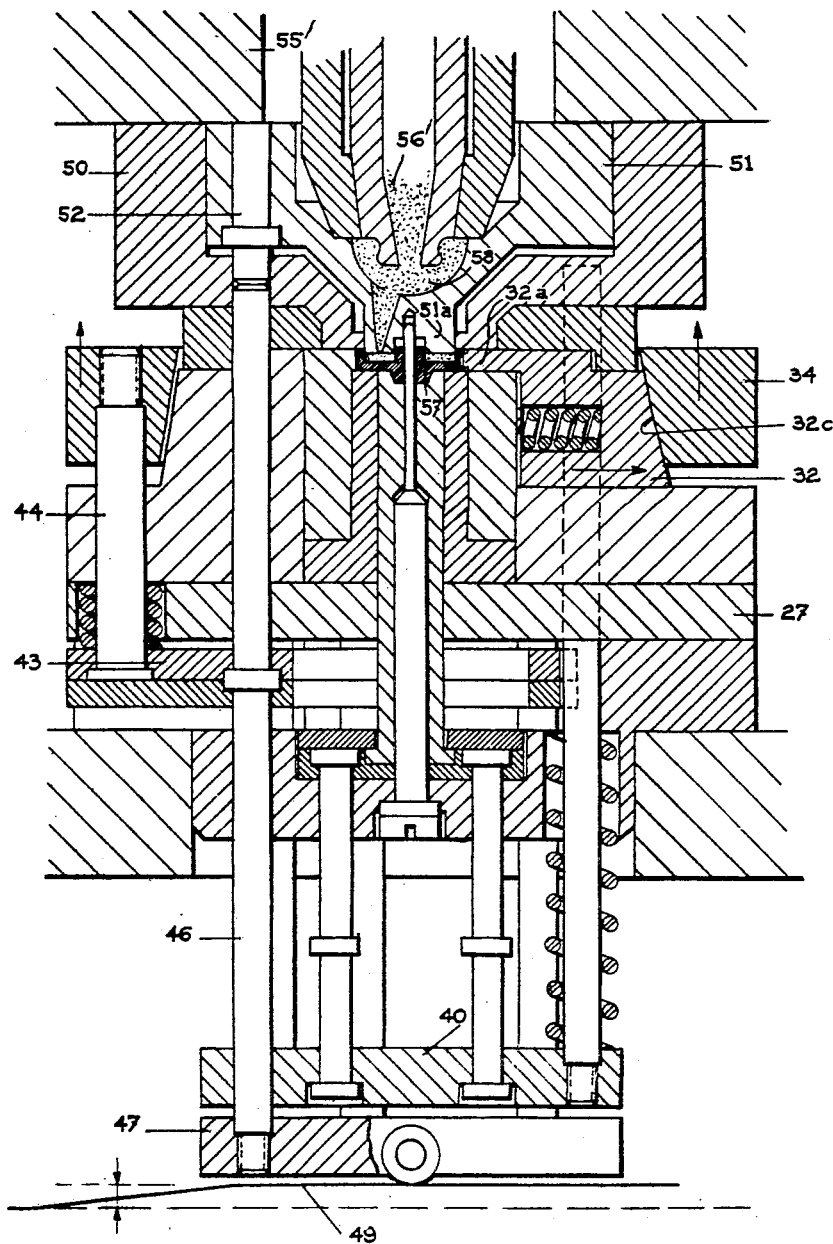
FIGURE 4 is a similar vertical sectional view for the molding of the signs.

After withdrawal of the piece, the mold is closed and put again under the first injector, thus taking again the position represented in FIGURE 3.

Figure 7:
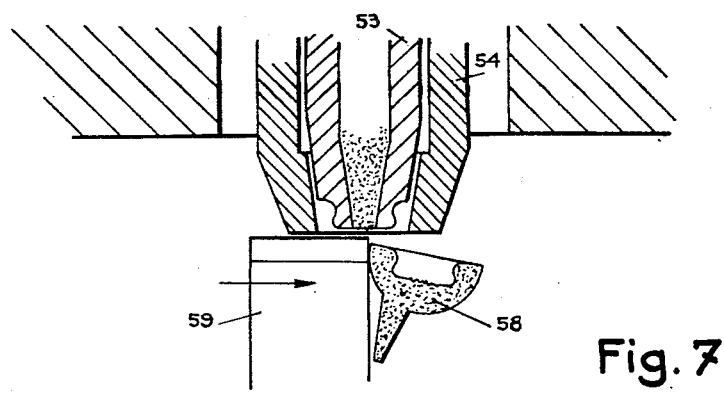
FIGURE 7 is a similar sectional view of a scraper pulling out a "sprue" from an injector.

Referring to FIGURE 7, a simple means for pulling out the sprues 58 from the injectors will be described. These sprues are formed between the injector and the internal cup 51 and in the conical hole of the latter (see FIGURES 3 and 4). The base which carries the mold has, between said molds, members 59 (FIGURE 7) which pass under the injectors after the passage of each mold. They pass on a level with external nozzles 54, whereas the internal nozzles 53 have risen a little distance. The rising of each nozzle 53 pulls out the sprues by the action on the end of each nozzle 54. The passage of member 59 completes said pulling out.

Figure 8:
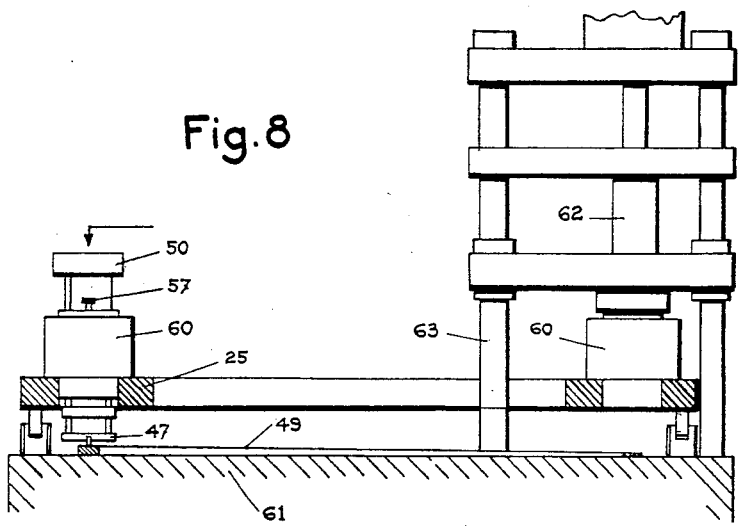
FIGURE 8 represents a vertical section of the assembly of a machine, on the right side, taken along line 8a of FIGURE 9, and on the left side, taken along line 8b of FIGURE 9; and, FIGURE 9 is a plan view of said assembly.
Figure 9:
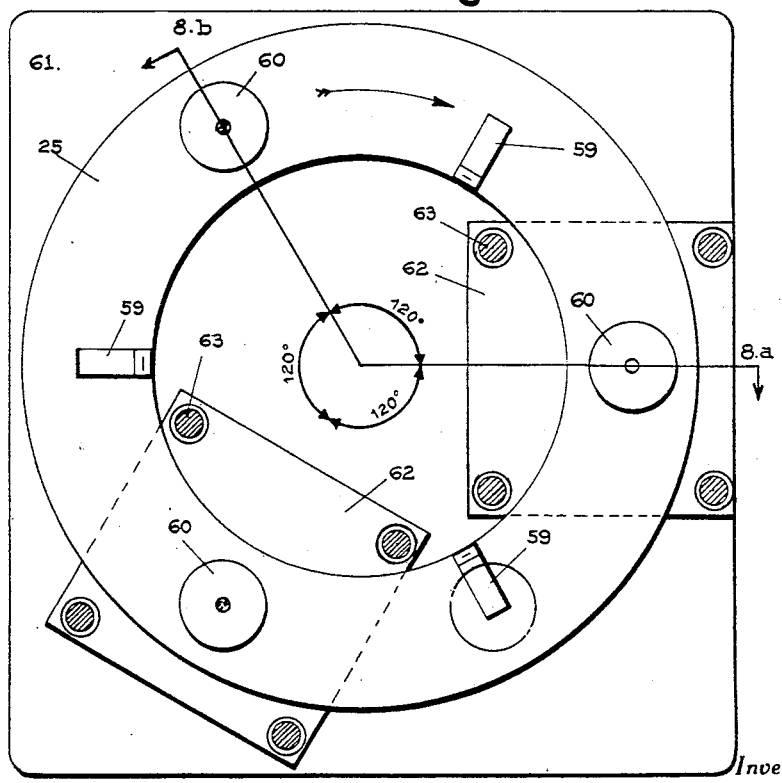

The general arrangement of the machine will now be described with reference to FIGURES 8 and 9. Molds 60 are carried by ring 25, and are rotating on a base 61 through driving means not represented. Two injection devices 62 are straddling over ring 25, each device being carried by means of four rods 63. On the left of FIGURE 8, mold 60 is represented in the stripping position with its upper part risen. On the right, mold 60 is represented engaged under an injection device. Members 59 are fixed to ring 25 between molds 60.

While the principles of the invention have been described in connection with a specific embodiment and particular modifications thereof, it is to be clearly understood that this description is made only by way of example and not as a limitation on the scope of the invention.

I claim:

1. A molding machine comprising a movable base, a mold mounted on said base, said mold comprising a first movable part and second movable parts with some of said second movable parts being relatively movable with respect to said first movable part so as to be independently retractable while said first movable part remains fixed in mold-forming position, and with said second movable parts adapted to have first and second cooperating positions with respect to said first movable part, said first position being a circumferential arrangement of said first and second movable parts providing a mold for the body portion of an article, and having recesses for the indicia with ducts therein leading thereto, for through passage of molding material, and said second position of said second movable parts, in cooperation with said body portion providing a mold for the material of said indicia, an injection duct, means for introducing body molding material into said mold through said injection duct therein, means for moving said second movable parts substantially radially from said first position to said second position, means for introducing said indicia molding material into said mold through said injection duct onto said molded body whereby said body portion may be molded in said first position and said indicia may be overmolded on said body part in said second position, means for moving said base step-by-step so that said mold passes successively through a first, a second, and a third station, a first source of body molding material at said first station, a second source of indicia molding material at said second station, means for connecting said injection duct to said first source when said mold is at said first station, means controlled by said base moving means to cause said first and second movable parts to move to said second position when said mold is moving between said first and second stations, means for connecting said injection duct to said second source when said mold is at said second station, and means at said third station for removing the molded article from said mold.

2. A molding machine according to claim 1 further comprising a scraper between said first and said second stations and a scraper between said second and third stations for cutting off the sprues of molding material after the molding steps have been completed.

3. A mold for a machine for molding articles carrying indicia on their outer surfaces comprising a first movable part and second movable parts, with some of said second movable parts being relatively movable with respect to said first movable part so as to be independently retractable while said first movable part remains fixed in mold-forming position, and with said second movable parts adapted to have first and second cooperating positions with respect to said first movable parts, said first position being a circumferential arrangement of said first and second parts providing a mold for the body portion of an article, and having recesses for the indicia with ducts therein leading thereto for through passage of molding material, and said second position of said second movable parts, in cooperation with said body portion providing a mold for the material of said indicia, an injection duct, means for introducing body molding material into said mold through said injection duct therein, means for moving said second movable parts substantially radially from said first position to said second position, means for introducing said indicia molding material into said mold through said injection duct onto said molded body whereby said body portion may be molded in said first position and said indicia may be overmolded on said body part in said second position.

4. A mold according to claim 3 wherein the outward radial motion of said second movable parts forms said recesses for said indicia, and said first movable part is movable axially with respect to said article to provide a duct for introducing molding material and to form a communication aperture between said duct and said recesses.

5. A mold according to claim 4 wherein said second movable parts are external dogs and said first movable part is an inner core with external ribs for contacting the inner ends of said external dogs.

References Cited in the file of this patent

UNITED STATES PATENTS

| | | |
|---|---|---|
| 2,226,408 | Nast | Dec. 24, 1940 |
| 2,244,565 | Nast | June 3, 1941 |
| 2,279,208 | Shaw | Apr. 7, 1942 |
| 2,288,187 | Gits et al. | June 30, 1942 |
| 2,333,059 | Tucker | Oct. 26, 1943 |
| 2,337,550 | Crosby | Dec. 28, 1943 |
| 2,544,140 | Dofsen et al. | Mar. 6, 1951 |
| 2,714,949 | Morin | Aug. 9, 1955 |
| 2,765,555 | Gits et al. | Oct. 9, 1956 |
| 2,783,502 | Abplanalp | Mar. 5, 1957 |
| 3,016,579 | Schlitzkus | Jan. 16, 1962 |
| 3,016,669 | Grosclaude | Jan. 16, 1962 |
| 3,020,594 | Makowski | Feb. 13, 1962 |
| 3,031,722 | Gits | May 1, 1962 |
| 3,086,250 | Gits | Apr. 23, 1963 |